United States Patent
Jackson et al.

(10) Patent No.: US 8,917,721 B2
(45) Date of Patent: Dec. 23, 2014

(54) METHODS AND APPARATUS TO CONTROL A FLASH CROWD EVENT IN A VOICE OVER INTERNET PROTOCOL (VOIP) NETWORK

(71) Applicant: AT&T Intellectual Property I, LP, Atlanta, GA (US)

(72) Inventors: James Jackson, Austin, TX (US); Mehrad Yasrebi, Austin, TX (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 92 days.

(21) Appl. No.: 13/711,868

(22) Filed: Dec. 12, 2012

(65) Prior Publication Data

US 2013/0121333 A1 May 16, 2013

Related U.S. Application Data

(63) Continuation of application No. 12/044,479, filed on Mar. 7, 2008, now Pat. No. 8,363,641.

(51) Int. Cl.
| | |
|---|---|
| *H04L 12/66* | (2006.01) |
| *H04L 29/06* | (2006.01) |
| *H04L 12/851* | (2013.01) |
| *H04L 12/853* | (2013.01) |
| *H04L 12/801* | (2013.01) |
| *H04L 29/08* | (2006.01) |
| *H04L 12/54* | (2013.01) |
| *H04L 12/863* | (2013.01) |

(52) U.S. Cl.
CPC .............. *H04L 12/66* (2013.01); *H04L 65/80* (2013.01); *H04L 47/2433* (2013.01); *H04L 47/2416* (2013.01); *H04L 47/10* (2013.01); *H04L 67/322* (2013.01); *H04L 65/1073* (2013.01); *H04L 12/5693* (2013.01); *H04L 47/6215* (2013.01); *H04L 47/11* (2013.01); *H04L 47/2441* (2013.01)

USPC ........................................... 370/352; 370/412

(58) Field of Classification Search
CPC ..... H04L 12/5693; H04L 47/10; H04L 47/11; H04L 47/2416; H04L 47/2433; H04L 12/66; H04L 47/6215; H04L 65/1073; H04L 65/80; H04L 67/322; H04L 47/2441; H04L 2012/5682
USPC .................. 370/352, 412, 444, 252, 235, 244
See application file for complete search history.

(56) References Cited

U.S. PATENT DOCUMENTS

| | | |
|---|---|---|
| 6,640,248 B1 | 10/2003 | Jorgensen |
| 6,650,619 B1 | 11/2003 | Schuster et al. |

(Continued)

OTHER PUBLICATIONS

United States Patent and Trademark Office, "Notice of Allowance," issued in connection with U.S. Appl. No. 12/044,479, mailed Sep. 26, 2012, 17 pages.

(Continued)

*Primary Examiner* — Brian D Nguyen
(74) *Attorney, Agent, or Firm* — Hanley, Flight & Zimmerman, LLC

(57) ABSTRACT

Methods and apparatus to control a flash crowd event in a voice over Internet protocol (VoIP) network are disclosed. An example method comprises receiving at a VoIP border element a VoIP registration response message having a field representing a priority assigned to a VoIP endpoint, receiving a message from the VoIP endpoint at the VoIP border element, detecting whether a network congestion condition exists, and placing the message received from the VoIP endpoint into one of a plurality of queues based on the priority when the congestion condition is detected.

19 Claims, 4 Drawing Sheets

(56) References Cited

U.S. PATENT DOCUMENTS

| | | |
|---|---|---|
| 7,099,332 B2 | 8/2006 | Leung |
| 7,170,863 B1 | 1/2007 | Denman et al. |
| 7,251,218 B2 | 7/2007 | Jorgensen |
| 8,305,894 B1 * | 11/2012 | Zang et al. .................... 370/232 |
| 2002/0114274 A1 | 8/2002 | Sturges et al. |
| 2003/0031164 A1 | 2/2003 | Nabkel et al. |
| 2005/0111362 A1 | 5/2005 | Freytsis et al. |
| 2005/0182833 A1 | 8/2005 | Duffie, III et al. |
| 2005/0210472 A1 * | 9/2005 | Accapadi et al. ............. 718/105 |
| 2005/0249214 A1 | 11/2005 | Peng |
| 2006/0007914 A1 | 1/2006 | Chandra et al. |
| 2006/0268692 A1 | 11/2006 | Wright et al. |
| 2007/0019625 A1 | 1/2007 | Ramachandran et al. |
| 2007/0073805 A1 | 3/2007 | Jorgensen |
| 2007/0076692 A1 | 4/2007 | Croak et al. |
| 2007/0133563 A1 | 6/2007 | Hundscheidt et al. |
| 2007/0206620 A1 | 9/2007 | Cortes et al. |
| 2007/0268823 A1 | 11/2007 | Madison et al. |
| 2008/0031258 A1 * | 2/2008 | Acharya et al. .......... 370/395.42 |
| 2008/0040718 A1 | 2/2008 | Cloonan et al. |
| 2008/0101354 A1 * | 5/2008 | Arndt ........................... 370/389 |
| 2008/0139166 A1 | 6/2008 | Agarwal et al. |
| 2008/0253390 A1 * | 10/2008 | Das et al. ...................... 370/465 |
| 2009/0059785 A1 * | 3/2009 | Jogalekar et al. ............. 370/230 |
| 2009/0225746 A1 | 9/2009 | Jackson et al. |

OTHER PUBLICATIONS

United States Patent and Trademark Office, "Non-Final Office Action," issued in connection with U.S. Appl. No. 12/044,479, mailed May 22, 2012, 14 pages.

"Acme Packet Net-Net OS for Session Border Controllers (SBCs)," retrieved from http://www.acmepacket.com/html/page.asp?PageID={06E4AEBC-24E2-46CC-BA95-7C74288FA,copyright 2003, 3 pages.

"Net-SAFE-The Security Requirements Framework for SBCs", retrieved from http://www.acmepacket.com/html/page.asp?PageID=%7BFB2657BA-EE7A-46C1-BEA8-F650C93BF5C3%7D, copyright 2003, 4 pages.

Hilt et al., "Session Initiation Protocol (SIP) Overload Control", retrieved from http://tools.ietf.org/html/draft-hilt-sipping-overload-03, Oct. 26, 2007, 35 pages.

* cited by examiner

METHODS AND APPARATUS TO CONTROL A FLASH CROWD EVENT IN A VOICE OVER INTERNET PROTOCOL (VOIP) NETWORK

CROSS REFERENCE TO RELATED APPLICATION

This patent is a continuation of and claims priority to U.S. patent application Ser. No. 12/044,479 (now U.S. Pat. No. 8,363,641), filed Mar. 7, 2008, entitled "Methods and Apparatus to Control a Flash Crowd Event in a Voice Over Internet Protocol (VOIP) Network," which is hereby incorporated herein by reference in its entirety.

FIELD OF THE DISCLOSURE

This disclosure relates generally to voice over Internet protocol (VoIP) networks and, more particularly, to methods and apparatus to control a flash crowd event in a VoIP network.

BACKGROUND

A "flash crowd" event occurs in a voice over Internet protocol (VoIP) network when a large number of endpoints simultaneously attempt to initiate communication sessions from within a given geographic area. Such events may happen, for example, in response to a natural disaster, a man-made disaster, and/or a significant news event. In some instances, a flash crowd event can overwhelm the signaling and/or protocol processing capabilities of all or a portion of the VoIP network leading to, for example, an inability to establish communication sessions from and/or to emergency response locations, such as hospitals, police stations and/or fire stations.

DETAILED DESCRIPTION

Methods and apparatus to control a flash crowd event in a voice over Internet protocol (VoIP) network are disclosed. A disclosed example method includes receiving at a VoIP border element a VoIP registration response message having field representing a priority assigned to a VoIP endpoint, receiving a message from the VoIP endpoint at the VoIP border element, detecting whether a network congestion condition exists, and placing the message received from the VoIP endpoint into one of a plurality of queues based on the priority when the congestion condition is detected.

A disclosed example VoIP border element includes a signaling processor to receive a VoIP registration response message having a field to represent a priority assigned to a VoIP endpoint, and a network processor communicatively coupled to the signaling processor via a plurality of queues, the network processor to receive a protocol message from the VoIP endpoint, and to place the protocol message into one of queues based on the priority when a congestion condition is present.

Another disclosed example method includes receiving a VoIP device registration request message from a VoIP endpoint, querying a database to obtain a priority corresponding to the VoIP endpoint, wherein the priority assigns the VoIP endpoint to a particular signaling processor queue of a VoIP border element, and sending a registration response message having a field representing the priority to the VoIP endpoint.

A disclosed example apparatus includes a session initiation protocol (SIP) registrar to receive a VoIP device registration request message from a VoIP endpoint, and a querier to query a database to obtain a priority corresponding to the VoIP endpoint, the priority is to assign the VoIP endpoint to a particular signaling processor queue of a VoIP border element during a flash crowd event, wherein the SIP registrar is to send a registration response message comprising the priority to the VoIP endpoint.

In the interest of brevity and clarity, throughout the following disclosure references will be made to the example Internet protocol (IP) Multimedia subsystem (IMS) based voice over IP (VoIP) network 110 of FIG. 1. Moreover, the following disclosure will be made using SIP messages and/or SIP-based message exchanges. However, the methods and apparatus described herein to control a flash crowd event are applicable to other IMS and/or VoIP communication systems and/or networks (e.g., networks based on soft switches), VoIP devices, IMS devices, feature servers, tElephone NUMber mapping (ENUM) servers, proxy servers, access networks, IP networks, IMS networks and/or IMS communication systems, and/or other types of protocols, messages, and/or message exchanges.

Figure 1:
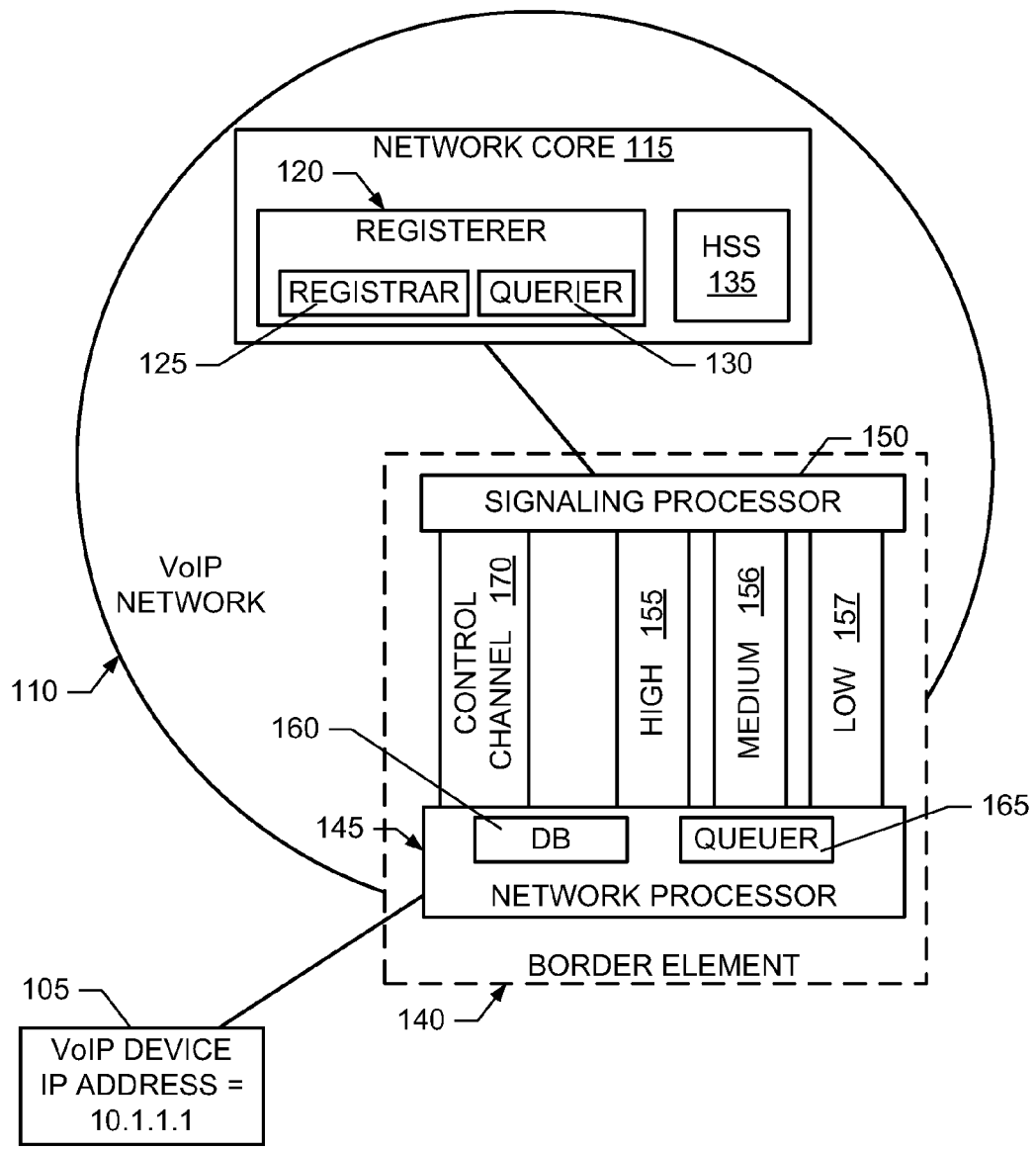
FIG. 1 is a schematic illustration of an example communication system constructed in accordance with the teachings of the disclosure.

FIG. 1 is a schematic illustration of an example communication system including any number and/or type(s) of VoIP user devices, one of which is designated at reference numerals 105. Example VoIP user devices 105 include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP device 105 of FIG. 1 may be implemented and/or be found at any number and/or type(s) of locations. Further, the VoIP device 105 may be a fixed location device, a substantially fixed location device and/or a mobile device. Moreover, the VoIP device 105 may have equipment communicatively and/or or electrically coupled to it. For example, a VoIP ATA may be coupled to a telephone, and/or a VoIP residential gateway may be coupled to a PC and/or set-top box.

To provide communication services to a set of subscribers, the example communication system of FIG. 1 includes a VoIP network 110. In general, the example VoIP network 110 of FIG. 1 provides and/or enables VoIP and/or IMS communication services (e.g., telephone services, Internet services, data services, messaging services, instant messaging services, electronic mail (email) services, chat services, video services, audio services, gaming services, voicemail, facsimile services, etc.) to the example VoIP device 105 and/or to other VoIP devices.

To implement the communication services, the example VoIP network 110 of FIG. 1 includes a network core 115. In the illustrated example VoIP network 110 of FIG. 1, before each VoIP device (e.g., the example VoIP device 105) can access the services provided by the VoIP network 110 and/or the network core 115, each VoIP device must register with the VoIP network 110. To register VoIP devices, the example network core 115 of FIG. 1 includes one or more registerers, one of which is designated at reference numeral 120 in FIG. 1. The example registerer 120 of FIG. 1 includes and/or implements any number and/or type(s) of SIP registrars, one of which is designated at reference numeral 125. The example SIP registrar 125 of FIG. 1 processes SIP REGISTER messages to register VoIP devices to the VoIP network 110.

Each VoIP device of the example VoIP communication system of FIG. 1 (e.g., the example VoIP device 105) is assigned a priority within the VoIP network 110 that reflects its importance relative to other VoIP devices and/or VoIP endpoints of the VoIP network 110. For example, communication session request messages associated with a high priority VoIP device (e.g., associated with a hospital, fire station, police station, etc.) may be processed before request messages associated with a lower priority VoIP device (e.g., associated with a standard consumer). The order in which prioritized protocol message are processed depends upon, for example, the queuing algorithm employed, network congestion, and/or a processing load of the VoIP network 110 and/or a particular device of the VoIP network 110 (e.g., a border element 140). A VoIP device's priority is determined by the example SIP registrar 125 when the VoIP device attempts to register to the VoIP network 110.

To allow the example SIP registrar 125 of FIG. 1 to determine the priority assigned to a VoIP device, the example registerer 120 of FIG. 1 includes a querier 130. The example querier 130 of FIG. 3 queries a home subscriber server (HSS) 135 during the registration process to determine the priority to be assigned to the VoIP device. An example query of the HSS 135 is performed based on a VoIP device identifier (e.g., a telephone number) assigned to a particular VoIP device. After registering a VoIP device, the example SIP registrar 125 responds with a registration response message containing a field and/or value that represents the priority assigned to the registered VoIP device. An example registration response message comprises a SIP 200 OK messaging comprising a priority header containing a value (e.g., 0=low, 1=medium and 2=high) that represents the priority of the VoIP device. In the illustrated example of FIG. 1, priorities are assigned to VoIP devices based upon classes and/or tiers of VoIP devices and/or subscribers. For example, emergency response locations (e.g., hospitals, fire stations and/or police stations) are assigned the highest priority, class and/or third tier; business locations and/or subscribers having service agreements for a specified level of service are assigned a medium priority, class and/or second tier; and individual, family, and/or residential consumers are assigned the lowest priority, class and/or first tier. However, any other method(s), rule(s) and/or algorithm(s) could be used to assign priorities, classes and/or tiers to VoIP devices and/or subscribers. Moreover, a priority assigned to a subscriber may be modified over time using any method(s), rule(s) and/or algorithm(s).

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 135. The example HSS 135 of FIG. 1 maintains an assigned priority, a device profile and/or one or more preferences for each subscriber and/or IMS device 105 and 106 of the IMS network 115.

While one registerer 120, one SIP registrar 125, one querier 130 and one HSS 135 are illustrated in FIG. 1, a network core (e.g., the example network core 115) and/or, more generally, a VoIP network (e.g., the example VoIP network 110) may include any number and/or type(s) of such devices and/or servers, and each such device and/or server may support any number and/or type(s) of VoIP devices.

To provide entry and/or exits points to the example VoIP network 110, the example VoIP network 110 of FIG. 1 includes any number of border elements (e.g., access and/or peered), one of which is designated at reference numeral 140. The example border element 140 of FIG. 1 implements a boundary point between a) one or more private networks used to implement the example VoIP network 110, and b) one or more public networks (e.g., the Internet), one or more private networks (e.g., home and/or corporate local area networks) and/or one or more access networks by which the example VoIP device 105 may be communicatively coupled to the network core 115.

To route traffic (e.g., messages, data and/or packets), the example border element 140 of FIG. 1 includes a network processor 145. The example network processor 145 of FIG. 1(*a*) routes SIP protocol traffic to a signaling processor 150 and (*b*) and performs simple functions such as IP and/or user datagram protocol (UDP) header re-writes of real-time protocol (RTP) communication session traffic as it passes thru the network processor 145 to its destination (e.g., to another border element, a VoIP device, a messaging server, a media gateway, a breakout gateway control function (BGCF) sever, etc.). Such RTP communication session traffic passes through the border element 140 without passing through the signaling processor 150. An example network processor 145 is the IXP 2400 network processor from Intel®.

To process SIP messages and/or signaling, the example border element 140 of FIG. 1 includes the example signaling processor 150. The example signaling processor 150 of FIG. 1 handles and/or processes incoming and/or outgoing SIP messages, and/or performs and/or carries out any other border element functionality. The example signaling processor 150 implements a state engine and/or maintains state information for SIP transactions, dialogs, and communication sessions. An example signaling processor 150 is a general purpose processor (single and/or multi-core).

The example signaling processor 150 of FIG. 1 may become overwhelmed (e.g., run out of memory and/or run out of processing cycles) during high call setup rate events, such as during a flash crowd event, that require a significant amount of processing of SIP messages and/or other signaling. To prioritize SIP protocol traffic for processing by the signaling processor 150, the example border element 140 of FIG. 1 includes any number of queues that communicatively couple the network processor 145 and the signaling processor 150. In the example border element 140 of FIG. 1, there are three queues: a high priority queue 155, a medium priority queue 156 and a low priority queue 157. When a SIP protocol message (e.g., a SIP INVITE message) is received from a VoIP device (e.g., the example VoIP device 105), the example network processor 145 of FIG. 1 places the SIP protocol message into one of the queues 155-157 based on the priority assigned to the VoIP device. For example, if the VoIP device was assigned a high priority during registration, the network processor 145 places its SIP protocol messages into the high priority queue 155.

To store the assignments of VoIP devices to queues, the example network processor 145 of FIG. 1 includes a database (DB) 160. For each registered VoIP device, the example database 160 stores a value representative of its assigned priority. An example data structure that may be used to implement the example database 160 is described below in connection with FIG. 4.

To place SIP protocol messages into one of the example queues 155-157, the example network processor 145 of FIG. 1 includes a queuer 165. When a SIP protocol message is received from a VoIP device, the example queuer 165 of FIG. 1 queries the example database 160 to determine the priority assigned to the VoIP device, and places the received SIP protocol message into the corresponding queue 155-157. For example, if the VoIP device was assigned a low priority during registration, the queuer 165 places its SIP protocol messages into the low priority queue 157. In some examples, the queuer 165 queries the example database 160 based on an IP address assigned to a particular VoIP device to retrieve the priority assigned to the VoIP device. Additionally or alternatively, the queuer 165 only prioritizes SIP protocol traffic when the signaling processor 150, the network core 115 and/or the VoIP network 110 is currently in a heavily loaded and/or congested state, for example, when the processing load of the signaling processor 150 exceeds a threshold. When the signaling processor 150 is not in a heavily loaded state, the queuer 165 of the illustrated example places all SIP protocol traffic into a common queue (e.g., the low priority queue 157) such that all SIP protocol traffic is handled and/or processed in a first-in first-out manner.

When a VoIP device registers to the VoIP network 110, the SIP registrar 125 responds with a registration response message (e.g., a SIP 200 OK message) containing a value and/or field that represents the priority assigned to the VoIP device. When the example signaling processor 150 of FIG. 1 receives the registration response message from the SIP registrar 125, the signaling processor 150: (a) modifies the registration response message to remove the priority assigned to the VoIP device, (b) forwards the modified registration response message to the VoIP device via the network processor 145, and (c) provides the assigned priority to the network processor 145 via a command channel 170. The example network processor 145 of FIG. 1 stores the priority received via the command channel 170 in the database 160 for future use by the queuer 165.

When a VoIP device fails to re-register with the VoIP network 110 within a re-registration window (e.g., 180 seconds), the signaling processor 150 flushes the registration information associated with the VoIP device from its registration cache, and instructs the network processor 145 to remove the VoIP device's priority record from the database 145. Likewise, if a VoIP device re-registers with a different IP address, the signaling processor 150 updates its registration cache and directs the network processor 150 to update the database 145.

While one network processor 145, one signaling processor 150, three queues 155-157, one database 160, one queuer 165, and one command channel 170 are illustrated in FIG. 1, a border element (e.g., the example border element 140) may include any number and/or type(s) of such devices.

The example signaling processor 150 of FIG. 1 processes SIP protocol traffic from the example queues 155-157 using any number and/or type(s) of logic, method(s) and/or algorithm(s). For example, the signaling processor 150 could process all traffic from the high priority queue 155 before processing any traffic from the medium and low priority queues 156 and 157. Alternatively, the signaling processor 150 could allocate a percentage of its processing cycles to process traffic from the medium and/or low priority queues 156 and 157 even if the high priority queue 155 contains traffic to be processed.

Call gapping is a traditional technique to control a large number of calls placed to a single telephone number. However, call gapping is performed at the SIP layer (e.g., layer 5) rather than at the IP layer (e.g., layer 3), and is designed to protect the core infrastructure of a VoIP network. Moreover, call gapping does not handle circumstances involving a large number of calls to many different destinations and, thus, does not allow different priority VoIP devices, and does not protect the signaling processor bandwidth of border elements. A traditional technique to mitigate denial-of-service attacks assigns VoIP devices to trusted and untrusted queues. VoIP devices which are currently assigned to the untrusted queue are limited in the rate at which they can initiate calls. However, during a flash crowd event there are many legitimate calls being placed and all of them would be placed in the same trusted queue. Such a circumstance would overwhelm the signaling processor bandwidth of border elements and treat all calls with the same priority. The methods and apparatus to control a flash crowd in VoIP networks described herein overcome at least the above mentioned deficiencies of existing and/or traditional techniques.

While example manners of implementing the example network core 115, the example registerer 120, the example border element 140, and the example network processor 145 have been illustrated in FIG. 1, one or more of the interfaces, data structures, elements, processes and/or devices illustrated in FIG. 1 may be combined, divided, re-arranged, omitted, eliminated and/or implemented in any other way. Further, the example registerer 120, the example SIP registrar 125, the example querier 130, the example network processor 145, the example signaling processor 155, the example queues 155-157, the example database 160, the example queuer 165 and/or the example control channel 170 may be implemented by hardware, software, firmware and/or any combination of hardware, software and/or firmware. Thus, for example, any or the example registerer 120, the example SIP registrar 125, the example querier 130, the example network processor 145, the example signaling processor 155, the example queues 155-157, the example database 160, the example queuer 165, the example control channel 170 and/or, more generally, the example VoIP network 110 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example registerer 120, the example SIP registrar 125, the example querier 130, the example network processor 145, the example signaling processor 155, the example queues 155-157, the example database 160, the example queuer 165, the example control channel 170 and/or, more generally, the example VoIP network 110 are hereby expressly defined to include a tangible medium such as a memory, a digital versatile disc (DVD), a compact disc (CD), etc. Further still, a network core, a registerer, a border element and/or a network processor may include interfaces, data structures, elements, processes and/or devices instead of, or in addition to, those illustrated in FIG. 1 and/or may include more than one of any or all of the illustrated interfaces, data structures, elements, processes and/or devices.

While an example VoIP network 110 has been illustrated in FIG. 1, the devices, networks, systems, servers and/or processors illustrated in FIG. 1 may be combined, divided, rearranged, eliminated and/or implemented in any way. For example, the example registerer 120, the example HSS 135 and the example border element 140 are logical entities. They may, therefore, be implemented separately and/or in any combination using, for example, machine accessible instructions executed by one or more computing devices and/or computing platforms (e.g., the example processing platform 9000 of FIG. 7). Further, the example VoIP network 110 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors. For example, the network core 115 may include one or more of an ENUM server, a domain name service (DNS) server, a feature server, a proxy call session control function (CSCF) server, an interrogating CSCF server, a feature server, an application server, a media gateway, a BGCF sever, a media gateway control function (MGCF) server, a softswitch, an IP router, an IP switch, etc.

Figure 2:
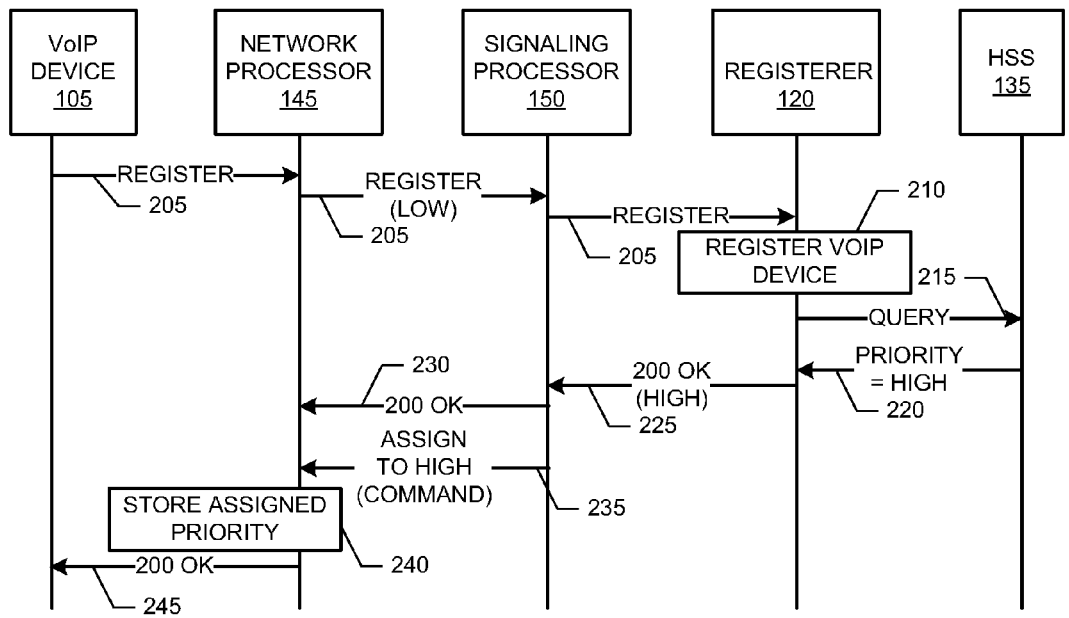
FIGS. 2 and 3 illustrate example protocol message exchanges and flowcharts representative of example machine accessible instructions that may be executed to implement any or all of the example border element, the example network processor, the example signaling processor and/or the example registerer of FIG. 1.
Figure 3:
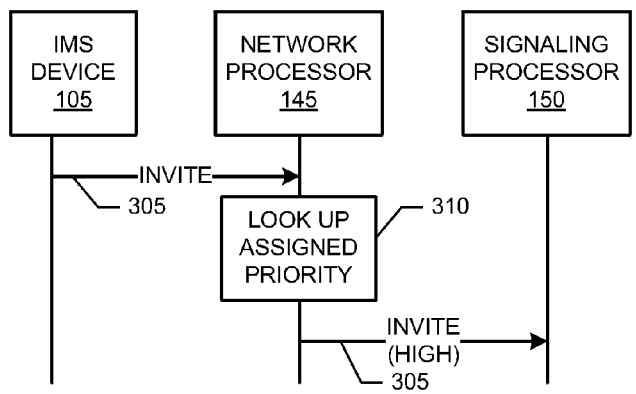

FIGS. 2 and 3 illustrates example protocol message exchanges, and/or flowcharts representative of example machine accessible instructions that may be executed by, for example, a processor to implement the example registerer 120, the example border element 140 and/or, more generally, the example VoIP network 110 of FIG. 1. The example exchanges and/or the example machine accessible instructions of FIGS. 2 and 3 may be carried out by one or more processor(s), controller(s) and/or any other suitable processing device(s). For example, the example exchanges and/or the example machine accessible instructions of FIGS. 2 and 3 may be embodied in coded instructions stored on a tangible medium such as a flash memory, a read-only memory (ROM) and/or random-access memory (RAM) associated with a processor (e.g., the example processor 9005 discussed below in connection with FIG. 7). Alternatively, some or all of the example exchanges and/or the example machine accessible instructions of FIGS. 2 and 3 may be implemented using any combination(s) of ASIC(s), PLD(s), FPLD(s), discrete logic, hardware, firmware, software, etc. Also, some or all of the example exchanges and/or the example machine accessible instructions of FIGS. 2 and 3 may be implemented manually or as any combination(s) of any of the foregoing techniques, for example, as any combination of firmware, software, discrete logic and/or hardware. Many other methods of implementing the example registerer 120, the example border element 140 and/or, more generally, the example VoIP network 110 of FIG. 1 may be employed. For example, the order of execution of the blocks of the example flowcharts and/or the example exchanges of FIGS. 2 and 3 may be changed, and/or some of the blocks and/or exchanges described may be changed, eliminated, sub-divided, and/or combined. Additionally, any or all of the example exchanges and/or the example machine accessible instructions of FIGS. 2 and 3 may be carried out sequentially and/or carried out in parallel by, for example, separate processing threads, processors, devices, discrete logic, circuits, etc.

The example protocol message exchanges of FIG. 2 may be carried out to register and assign a priority to a VoIP device (e.g., the example VoIP device 105 of FIG. 1). The example protocol message exchanges of FIG. 2 begin when the VoIP device 105 sends a SIP REGISTER message 205. The example SIP REGISTER message 205 is received at the example network processor 145, and forwarded by the network processor 145 to the example signaling processor 150 via a default priority queue (e.g., the example low priority queue 157). The signaling processor 150 forwards the SIP REGISTER message 205 to the example registerer 120.

The example SIP registrar 125 of the registerer 120 registers the VoIP device (block 210), and the example querier 130 of the registerer 120 then queries 215 the example HSS 135 to obtain and/or retrieve a priority 220 assigned to the VoIP device. The SIP registrar 125 sends a registration response message 225 (e.g., a SIP 200 OK message) to the signaling processor 150. The example registration response message 225 comprises a priority header containing the priority.

When the signaling processor 150 receives the registration response message 225, the signaling processor 150 modifies the message 225 to remove the priority, and sends the modified message 230 to the network processor 145 to be forwarded to the VoIP device 105 as SIP 200 OK message 245. The signaling processor 150 also sends a command 235 (e.g., via the example command channel 170) to provide the priority assigned to the VoIP device 105 to the network processor 145. In response to the command 235, the network processor 145 stores an association of the assigned priority to the IP address of the VoIP device 105 (block 240). The example signaling processor 150 of FIG. 2 sends the example messages 230 and 235 at substantially concurrent time instants, and may send the messages 230 and 235 in either order. In some examples, the message 235 is sent first to reduce the likelihood of a rare race condition, such as when the device 105 quickly sends a subsequent SIP INVITE message (e.g., the example SIP INVITE message 305 of FIG. 3) after receiving the SIP 200 OK message 245, but before network processor 145 has had a chance to process the message 235. To further reduce the likelihood of such race conditions, the network processor 145 may ensure that the messages 230 and 235 are processed before sending the SIP 200 OK message 245 to the VoIP device 105.

The example protocol message exchanges of FIG. 3 occur subsequent to the example protocol message exchanges of FIG. 2, when the VoIP device 105 sends a SIP protocol message 305 (e.g., a SIP INVITE message). When the network processor 145 receives the SIP protocol message 305, the example queuer 165 of the example network processor 145 queries the example database 160 to obtain and/or retrieve the priority (e.g., high) assigned to the VoIP device 150 (block 310). Based on the obtained priority, the queuer 165 forwards the protocol message 305 to the signaling processor 150 via the queue (e.g., the high priority queue 155) associated with the assigned priority.

Figure 4:
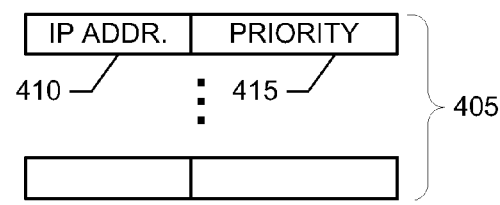
FIG. 4 illustrates an example data structure that may be used to implement the example database of FIG. 1.

FIG. 4 illustrates an example data structure that may be used to implement the example database 160 of FIG. 1. The example data structure of FIG. 4 contains a plurality of records 405 for respective ones of a plurality of registered VoIP devices. To identify a VoIP device (e.g., the example VoIP device 105), each of the example records 410 of FIG. 4 includes an IP address field 410. The example IP address field 410 of FIG. 4 includes an alphanumeric string (e.g., of the form X.Y.Z.K) that represents an IP address assigned to a VoIP device.

To store a priority, each of the example records 405 of FIG. 4 includes a priority field 415. The example priority field 415 contains a number (e.g., 0=high, 1=medium and 2=low) represents the priority assigned to the VoIP device identified by the IP address field 410.

While an example data structure is illustrated in FIG. 4, the example data structure may be implemented using any number and/or type(s) of other and/or additional fields and/or data. Further, the fields and/or data illustrated in FIG. 4 may be combined, divided, re-arranged, eliminated and/or implemented in any way. Moreover, the example data structure may include fields and/or data in addition to, or instead of, those illustrated in FIG. 4, and/or may include more than one of any or all of the illustrated fields and/or data.

Figure 5:
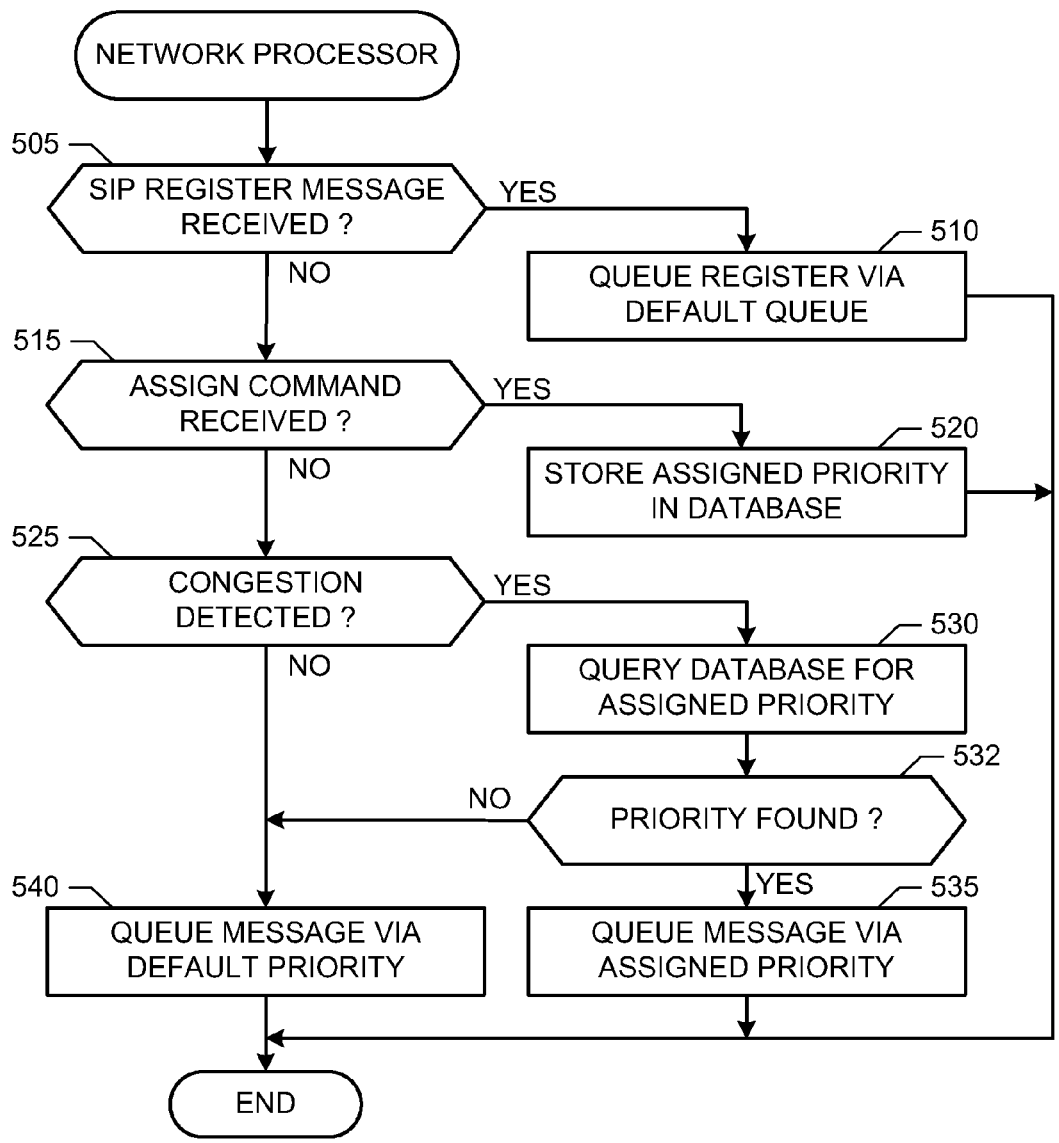
FIG. 5 is a flowchart representative of example machine accessible instructions that may be executed by, for example, a processor to implement the example border element of FIG. 1.
Figure 6:
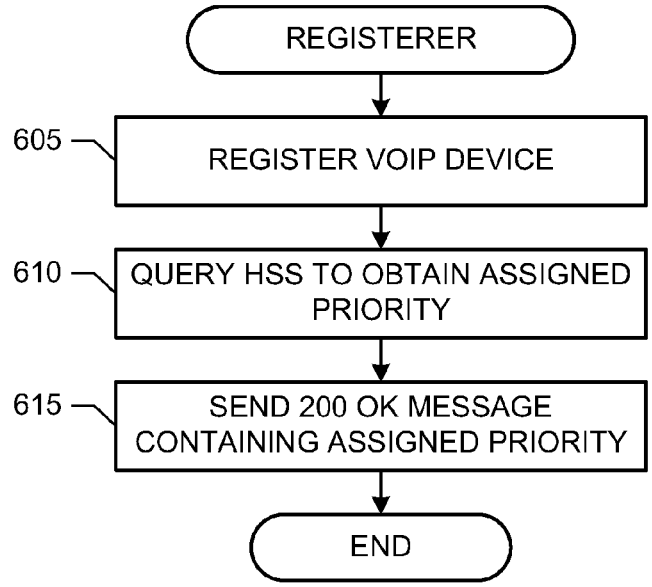
FIG. 6 is a flowchart representative of example machine accessible instructions that may be executed by, for example, a processor to implement the example registerer of FIG. 1.

FIG. 5 illustrates example machine accessible instructions that may be executed to implement the example network processor 145 of FIG. 1. FIG. 6 illustrates example machine accessible instructions that may be executed to implement the example registerer 120 of FIG. 1. The example machine accessible instructions of FIGS. 5 and/or 6 may be carried out by a processor, a controller and/or any other suitable processing device. For example, the example machine accessible instructions of FIGS. 5 and/or 6 may be embodied in coded instructions stored on a tangible medium such as a flash memory, a ROM and/or RAM associated with a processor (e.g., the example processor 9005 discussed below in connection with FIG. 7). Alternatively, some or all of the example machine accessible instructions of FIGS. 5 and/or 6 may be implemented using any combination(s) of ASIC(s), PLD(s), FPLD(s), discrete logic, hardware, firmware, etc. Also, some or all of the example machine accessible instructions of FIGS. 5 and/or 6 may be implemented manually or as any combination of any of the foregoing techniques, for example, any combination of firmware, software, discrete logic and/or hardware. Further, many other methods of implementing the example operations of FIGS. 5 and/or 6 may be employed. For example, the order of execution of the blocks may be changed, and/or one or more of the blocks described may be changed, eliminated, sub-divided, or combined. Additionally, any or all of the example machine accessible instructions of FIGS. 5 and/or 6 may be carried out sequentially and/or carried out in parallel by, for example, separate processing threads, processors, devices, discrete logic, circuits, etc.

The example machine accessible instructions of FIG. 5 begin when the example network processor 145 of FIG. 1 receives a command and/or SIP protocol message. The network processor 145 determines whether a registration request message (e.g., a SIP REGISTER message) was received (block 505). If a registration request message was received (block 505), the example queuer 165 of the network processor 145 forwards the registration request message to the example signaling processor 150 via a default priority queue (e.g., the example low priority queue 157) (block 510). Control then exits from the example machine accessible instructions of FIG. 5.

Returning to block 505, if a registration request message was not received, the network processor 145 determines whether a priority command was received from the signaling processor 150 (e.g., via the example control channel 170 of FIG. 1) (block 515). If a priority command was received (block 515), the network processor 145 stores the assigned priority in the example database 160 (block 520). Control then exits from the example machine accessible instructions of FIG. 5.

Returning to block 515, if a priority command was not received (block 515), then the network processor 145 has received another type of SIP protocol message (e.g., a SIP INVITE message). The queuer 165 of the network processor 145 determines whether the signaling processor 150 is congested (e.g., by comparing a current processing load to a threshold) (block 525). If the signaling processor 150 is congested (block 525), the queuer 165 queries the database 160 to obtain and/or retrieve the priority assigned to the VoIP device (block 530). If a priority for the VoIP device is found in the database 160 (block 532), the signaling processor 150 forwards the received SIP protocol message to the signaling processor 150 via the queue 155-157 corresponding to the priority (block 535). Control then exits from the example machine accessible instructions of FIG. 5.

Returning to block 532, if a priority for the VoIP device is not found in the database 160 (block 532), the signaling processor 150 forwards the SIP protocol message to the signaling processor 150 via the default queue 155-157 (block 540). Control then exits from the example machine accessible instructions of FIG. 5.

Returning to block 525, if the signaling processor 150 is not congested (block 525), the queuer 165 forwards the SIP protocol message to the signaling processor 150 via the default queue 155-157 (block 540). Control then exits from the example machine accessible instructions of FIG. 5.

The example machine accessible instructions of FIG. 6 begin when the example registerer 120 of FIG. 1 receives a registration request message (e.g., a SIP REGISTER message) from the example border element 140 of FIG. 1. The example SIP registrar 125 of the registerer 120 registers the VoIP device (block 605). The example querier 140 of the registerer 120 queries the example HSS 135 to obtain the priority assigned to the VoIP device (block 610). The SIP registrar 125 then sends a registration response message (e.g., a SIP 200 OK message) containing the priority in, for example, a priority header of the response message (block 615). Control then exits from the example machine accessible instructions of FIG. 6.

Figure 7:
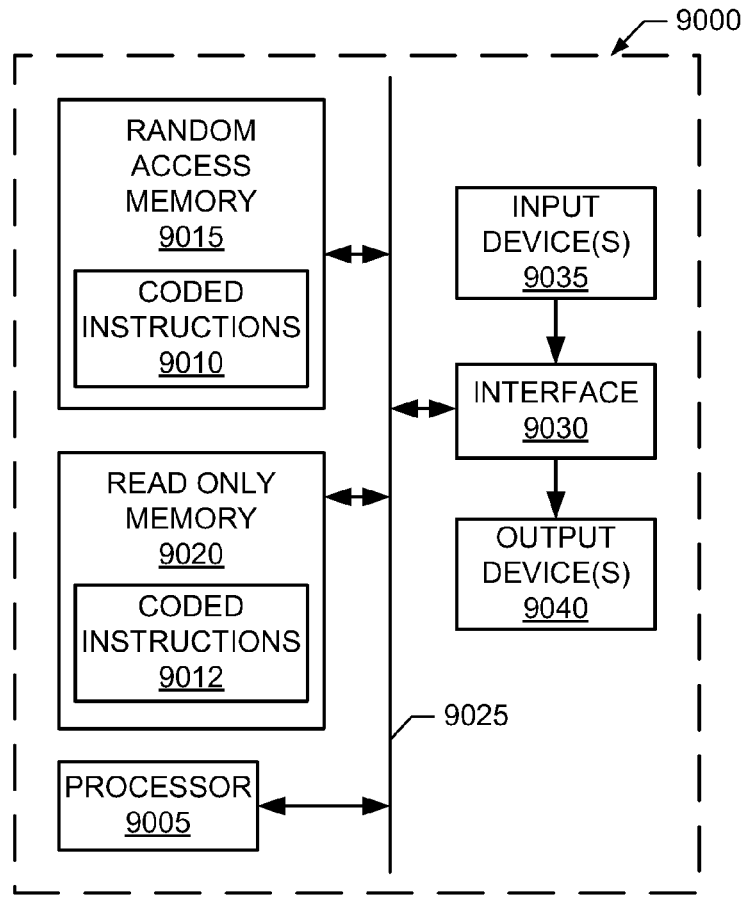
FIG. 7 is a schematic illustration of an example processor platform that may be used and/or programmed to carry out the example machine accessible instructions of FIGS. 5 and/or 6 to implement any of all of the example methods and apparatus described herein.

FIG. 7 is a schematic diagram of an example processor platform 9000 that may be used and/or programmed to implement all or a portion of any or all of the example registerer 120, the example border element 140, the example network processor 145, the example queues 155-157, the example signaling processor 150 and/or, more generally, the example VoIP network 110 of FIG. 1. For example, the processor platform 9000 can be implemented by one or more general purpose processors, processor cores, microcontrollers, etc.

The processor platform 9000 of the example of FIG. 7 includes at least one general purpose programmable processor 9005. The processor 9005 executes coded instructions 9010 and/or 9012 present in main memory of the processor 9005 (e.g., within a RAM 9015 and/or a ROM 9020). The processor 9005 may be any type of processing unit, such as a processor core, a processor and/or a microcontroller. The processor 9005 may execute, among other things, the example protocol message exchanges and/or the example machine accessible instructions of FIGS. 5 and/or 6 to implement the example methods and apparatus described herein.

The processor 9005 is in communication with the main memory (including a ROM 9020 and/or the RAM 9015) via a bus 9025. The RAM 9015 may be implemented by DRAM, SDRAM, and/or any other type of RAM device, and ROM may be implemented by flash memory and/or any other desired type of memory device. Access to the memory 9015 and the memory 9020 may be controlled by a memory controller (not shown). One or both of the example memories 9015 and 9020 may be used to implement the example HSS 135 and/or the example database 160 of FIG. 1.

The processor platform 9000 also includes an interface circuit 9030. The interface circuit 9030 may be implemented by any type of interface standard, such as an external memory interface, serial port, general purpose input/output, etc. One or more input devices 9035 and one or more output devices 9040 are connected to the interface circuit 9030. The input devices 9035 and/or output devices 9040 may be used to, for example, implement the example querier 130, the example queues 155-157 and/or the example control channel 170 of FIG. 1.

The order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   obtaining, at a voice over Internet protocol border element, a voice over Internet protocol registration response message having a field representing a priority assigned to a voice over Internet protocol endpoint, and having a session initiation protocol 200 OK message;
   obtaining a message from the voice over Internet protocol endpoint at the voice over Internet protocol border element;
   detecting whether a processing load of a border element signaling processor exceeds a threshold;
   placing the message obtained from the voice over Internet protocol endpoint into one of a plurality of queues based on the priority when the threshold is exceeded; and
   placing the message obtained from the voice over Internet protocol endpoint into a default queue when the threshold is not exceeded.

2. A method as defined in claim 1, further comprising querying a database based on an Internet protocol address associated with the voice over Internet protocol endpoint to retrieve the priority.

3. A method as defined in claim 1, wherein the plurality of queues communicatively couple a network processor and the signaling processor of the voice over Internet protocol border element, and the signaling processor is to process a second message from a highest priority queue before processing a third message from a lower priority queue.

4. A method as defined in claim 1, further comprising:
   obtaining a registration request message from the voice over Internet protocol endpoint; and
   sending the registration request message to a session initiation protocol registrar, wherein the registration response message is obtained from the session initiation protocol registrar.

5. A method as defined in claim 1, wherein the message obtained from the voice over Internet protocol endpoint comprises a session initiation protocol INVITE message.

6. A method as defined in claim 1, further comprising placing the message obtained from the voice over Internet protocol endpoint into a high priority queue when the endpoint is associated with an emergency service location.

7. A method as defined in claim 1, further comprising placing the message obtained from the voice over Internet protocol endpoint into a high priority queue when the endpoint is associated with a first tier consumer.

8. A voice over Internet protocol border element comprising:
   a signaling processor to obtain a voice over Internet protocol registration response message having a field to represent a priority assigned to a voice over Internet protocol endpoint; and
   a network processor communicatively coupled to the signaling processor via a plurality of queues, the network processor to obtain a protocol message from the voice over Internet protocol endpoint, the network processor to place the protocol message into one of the plurality of queues based on the priority when a processing load of the signaling processor exceeds a threshold, and when the threshold is not exceeded, the network processor is to place the protocol message into a default queue.

9. A voice over Internet protocol border element as defined in claim 8, wherein the signaling processor is to provide the priority to the network processor via a command channel.

10. A voice over Internet protocol border element as defined in claim 8, wherein the network processor comprises:
    a database to store the priority in association with a voice over Internet protocol endpoint identifier; and
    a queuer to query the database to obtain the priority based on the voice over Internet protocol endpoint identifier assigned to the voice over Internet protocol endpoint, and to place the protocol message into one of the plurality of queues based on the obtained priority.

11. A voice over Internet protocol border element as defined in claim 10, wherein the voice over Internet protocol endpoint identifier comprises an Internet protocol address.

12. A voice over Internet protocol border element as defined in claim 8, wherein the signaling processor is to processes a second message from a highest priority queue before processing a third message from a lower priority queue.

13. A voice over Internet protocol border element as defined in claim 8, wherein the network processor is to place the protocol message into a highest priority queue when the endpoint is associated with an emergency service location.

14. A voice over Internet protocol border element as defined in claim 8, wherein the network processor is to place the protocol message into a highest priority queue when the endpoint is associated with a first tier consumer.

15. A tangible machine readable storage device comprising instructions which, when executed, cause a machine to perform operations comprising:
   obtaining, at a voice over Internet protocol border element, a voice over Internet protocol registration response message having a field representing a priority assigned to a voice over Internet protocol endpoint;
   obtaining a message from the voice over Internet protocol endpoint at the voice over Internet protocol border element;
   detecting whether a processing load of a border element signaling processor exceeds a threshold;
   placing the message obtained from the voice over Internet protocol endpoint into one of a plurality of queues based on the priority when the threshold is exceeded; and
   placing the message obtained from the voice over Internet protocol endpoint into a default queue when the threshold is not exceeded.

16. A tangible machine readable storage device as defined in claim 15, wherein the machine readable instructions, when executed, cause the machine to query a database based on an Internet protocol address associated with the voice over Internet protocol endpoint to obtain the priority.

17. A tangible machine readable storage device as defined in claim 15, wherein the plurality of queues communicatively couple a network processor and a signaling processor of the voice over Internet protocol border element, and the signaling processor is to process a second message from a highest priority queue before processing a third message from a lower priority queue.

18. A tangible machine readable storage device as defined in claim 15, wherein the machine readable instructions, when executed, cause the machine to:
   obtain a registration request message from the voice over Internet protocol endpoint; and
   send the registration request message to a session initiation protocol registrar, wherein the registration response message is obtained from the session initiation protocol registrar.

19. A tangible machine readable storage device as defined in claim 15, wherein the machine readable instructions, when executed, cause the machine to place the message obtained from the voice over Internet protocol endpoint into a high priority queue when the endpoint is associated with an emergency service location.

* * * * *